United States Patent [19]

Sobel

[11] 4,428,135

[45] Jan. 31, 1984

[54] PICTURE FRAME ASSEMBLIES

[76] Inventor: David D. Sobel, 15415 N. 22nd St., Phoenix, Ariz. 85022

[21] Appl. No.: 456,707

[22] Filed: Jan. 10, 1983

[51] Int. Cl.³ .............................................. G09F 1/12
[52] U.S. Cl. ...................................... 40/155; 40/152; 403/401; 403/402
[58] Field of Search ................. 40/155, 152; 403/401, 403/402

[56] References Cited

U.S. PATENT DOCUMENTS 4,106,476  8/1978  Harsha .................................. 403/401
4,161,977  7/1979  Baslow ................................. 403/401

FOREIGN PATENT DOCUMENTS 2640642  3/1978  Fed. Rep. of Germany ........ 40/152

Primary Examiner—Robert Peshock
Assistant Examiner—Cary E. Stone
Attorney, Agent, or Firm—Bauer & Amer

[57] ABSTRACT

A bracket for a frame assembly having at least one side member provided with a slot and channel. The bracket is formed of a flat base having a pair of spaced parallel ribs extending from one surface. Each of the ribs is provided with a flange extending in opposite directions. The bracket is pressed into the slot.

22 Claims, 3 Drawing Figures

U.S. Patent   Jan. 31, 1984   4,428,135
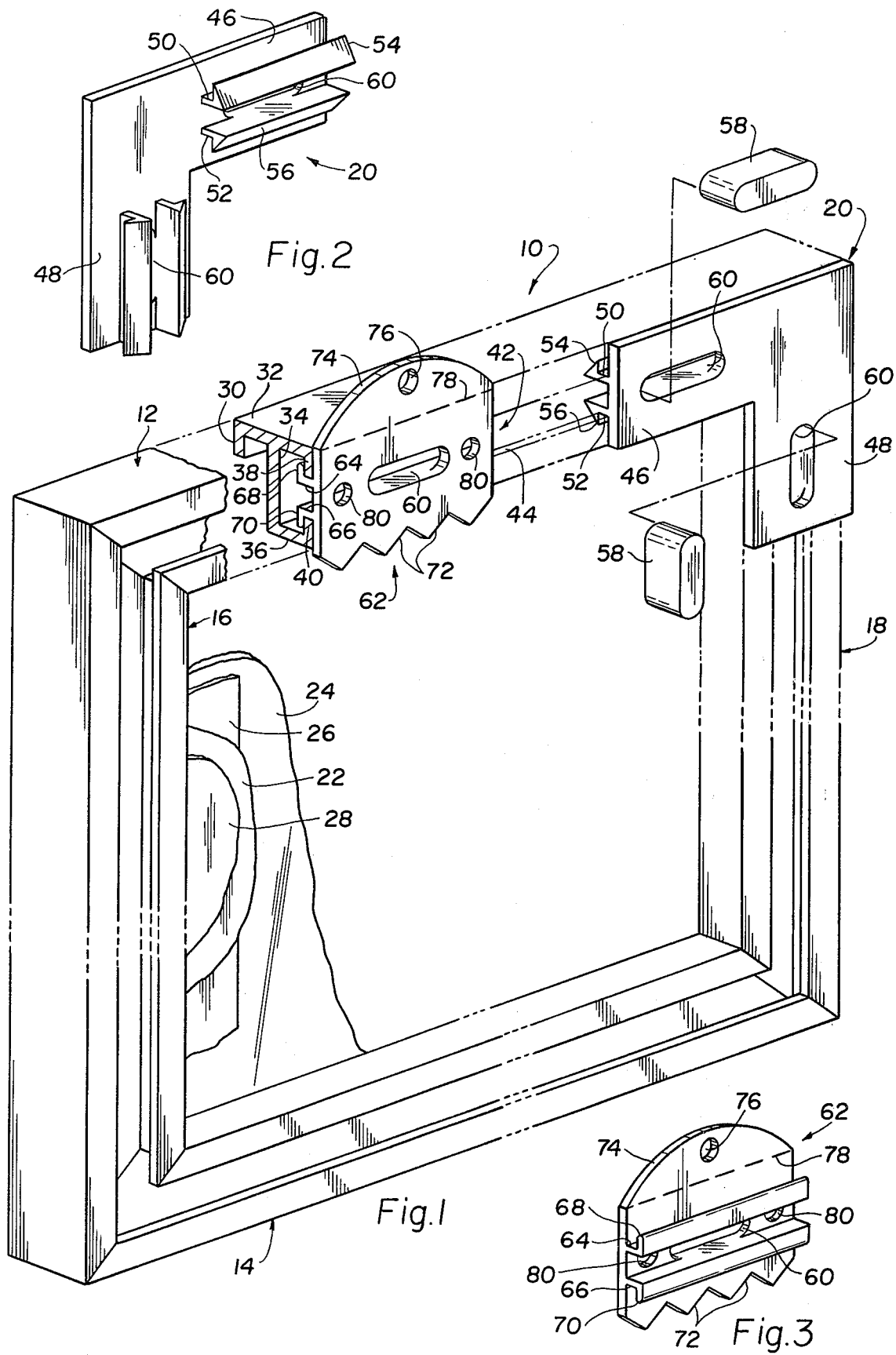

PICTURE FRAME ASSEMBLIES

BACKGROUND OF THE INVENTION

The present invention relates to bracket members for picture frame assemblies of the type generally referred to as of the "art frame", i.e., formed of extruded aluminum (and/or plastic) channel members, and more particularly to the corner and hanging brackets with which such channel members are assembled.

Generally such frames are formed of extruded border members, having a channel open to the front face for receipt of a picture or other art subject, glass, matting etc., in conventional arrangement, and at least one channel on the rear face, allowing the introduction of corner brackets, hanging brackets and the like so that the border members may be joined into a frame and hung or otherwise manipulated.

It is the form and construction of the corner bracket that provides a number of problems and difficulties. In one of the known assemblies, a metal angle bracket having flat blade like arms is shoved, longitudinally into corresponding channels in the adjacent border members. It is often unwieldly and sometimes very difficult to assemble the four border members necessary to complete the frame using such brackets, particularly when it is necessary to also include picture, glass, etc. simultaneously. In addition, these slidably insertable brackets require screws or detent means to fixedly secure them in place lest the border members pull apart in use.

It was also known to provide an elastic angle bracket member which is transversly insertable into the rear groove, by merely pressing it therein. Such member, made of rubber, or soft plastic are sometimes provided with nobs or heads which must themselves first be inserted in holes made in the channel so that the bracket would be fixedly held. This arrangement was helpful in allowing plural border members to be first arranged, in the exact form of the frame, with the picture, glass, etc. in place and then secured together. However, elastic angle pieces are inherently unstable, and require the formation of holes in the channel member at precise points. As a result such brackets frequently "popped" out of its seat, or were difficult to fabricate.

A further problem exists in the prior art frames, namely, the provision of a "hanger" or means for hanging the frame. Hangers were generally formed of washer like bodies insertable from one end into the rear groove or channel of at least one border member before the corner brackets were attached. The hanger is held in place by a screw bearing against the bottom of the channel. Once the hanger member is secured and hung on the wall it could not be adjusted from the front of the frame, but the frame had to be removed from the wall and the screw repositioned. Of course, some hangers were not provided with screws, but these hangers were then freely movable along the length of the respective border members and thus not readily adjustable into a more or less fixed position. Most frequently, however, the lay person, who would assemble the frame, merely forgot to insert the hanger in the groove or channel prior to closing the end thereof with the corner angle bracket. As a result, the person either had to forego the insertion of the hanger or completely disassemble the frame and start over again.

It is the object of the present invention to provide bracket members for frame assemblies of the type described in which the disadvantages and difficulties enumerated above are overcome and/or avoided.

It is a specific object of the present invention to provide a frame having channel border members joined by a simple easily constructed and simply usable corner bracket.

It is another specific object to provide a hanger which can be easily insertable in the channel, adjusted into desired position and thereafter remain relatively fixed in position.

It is in general an object of this invention to provide a frame assembly in which the connecting corner bracket, and hangers are insertable into the groove or channel transversely, by snapping the same into place, and being provided with integral means for maintaining them in place.

The foregoing objects, together with other objects, features and advantages will become apparent from the following disclosure of the present invention.

SUMMARY OF THE INVENTION

According to the present invention, a corner bracket and hanger are provided with strikingly similar construction. Each bracket comprises a flat base having a pair of spaced ribs extending parallel to each other from one surface. The ribs are flexible, relative to the base and each is provided with a flange at the end thereof, the flanges extending oppositely to each other. Thus, the bracket may be pressed, pushed, or merely inserted by the ribs with a slot formed on one side of a border member, and firmly held in place by the resiliant biasing of the ribs and flanges against the walls forming the slot.

Preferably, the border members are extruded elongated strips each having a front, side and rear wall including a channel at least in part defined by a longitudinally slotted wall.

The bracket may be in the form of a simple rectangular base and used as a hanger. Preferably, the lower edge will be notched to enable its hooking over a nail.

The corner bracket is in the form of a base member having a pair of legs set at an angle to each other, each leg having ribs.

Full details of the invention are set forth in the following description and are illustrated in the accompanying drawing.

BRIEF DESCRIPTION OF THE DRAWING

In the drawing

FIG. 1 is a rear perspective view, partially in section, of a frame embodying the present invention showing both the corner bracket and hanger in place.

FIG. 2 is a perspective view of the rear of the corner bracket seen in FIG. 1.

FIG. 3 is a perspective view of the rear of the hanger bracket seen in FIG. 1.

DESCRIPTION OF THE INVENTION

Referring in detail to the drawing, a rectangular "art frame", generally depicted by the numeral 10 is shown, comprising a pair of top and bottom elongate border members 12 & 14 and a pair of elongate side border members 16 & 18. Each border member has its ends suitably mitred so that they may be joined together, by a corner bracket 20, to be described in detail hereinafter. A picture or other suitable art work, generally depicted by the numeral 22, is mounted in the frame, together with the usual front glass 24, mat 26 and backing member 28, one or more of which may be eliminated as desired.

Each of the border members have identical transverse cross sections comprising a front wall 30 having a decorative flat or curved design, a side wall 32 of similar decorative design, and an intermediate wall 34, the design of which is of little consequence. The front wall 30 and intermediate wall 34 are spaced from each other and cooperate to retain them between the art work, glass, mats, backing, etc., which are slidable into the space prior to the final assembly of the frame.

Extending from the edge of the intermediate wall 34, parallel and coextensive with the side wall 32 is a rearward extension 36. The side wall 32 and the rearward extension 36 are provided with right angled edges 38 and 40 respectively which are spaced from and opposed to one another to form a rear wall defined within the frame member an elongate T-shaped channel 42 having a narrow slot opening 44.

Each corner bracket 20 is flat having a substantially L-shaped form; the legs 46 and 48 extending at a right angle to each other with a width sufficient to overlie both of the opposed edges 38 & 40 of the rear wall. Each leg 46 & 48 has a pair of parallel projecting ribs 50 & 52 forming locking feet. Each rib is provided with a barbed flange 54 & 56 respectively extending in opposite directions away from each other. The ribs 50 & 52 are symmetrically arranged on the rear surface of the bracket 20 with respect to the central longitudinal axis so that their outer surfaces are spaced apart a distance substantially equal to the span of the slot 44. The barbed flanges 54 and 56 are set at the end of the ribs 50 and 52 a distance equal to the thickness of the rear wall. Thus, the ribs which are flexible relative to the base, and barbed flanges can be snapped through the slot 44 into the channel 42 with the flanges 38 and 40 firmly secured between barbs and the rear face of the bracket 20.

Preferably, the bracket 20 is extruded of a plastic having sufficient rigidity to hold the frame members, but with the ribs 50 & 52 of sufficient resiliency or springiness relative to the base that snapping, into place, is easily effected. The bracket 20 can also be made of aluminum, which also provides suitable overall rigidity and sufficient spring action for the ribs.

In the event, where the engagement of the bracket 20 with the frame members is not tight enough to hold the border members securely fixed, a wedge member 58 may be driven through a conforming hole 60 in one or both legs 46 and 48 of the bracket, between the ribs, forcing the ribs laterally apart and into tighter engagement with the flanges 38 and 40 forming the rear wall. The ribs 50 and 52 extend substantially the length of each of the bracket legs and may join in a mitred corner, although it is preferable, as seen in FIG. 2 that they do not do so, so that complete independence of action is retained for each of the bracket legs.

The hanger of the present invention, generally depicted by the numeral 62, is similar in construction to the angle bracket although it comprises only a single rectangular base member, substantially equal in width and sufficient to overlie both of the flanges 38 and 40. The hanger has a pair of ribs 64 and 66 and laterally opposed barb flanges 68 and 70, which allow it to snap into the channel 42. The hanger is slidable along the length of the frame member and relying on the inherent frictional contact of the locking legs may be maintained in place once its desired position is found. However, the hanger is preferably made with an oblong hole 60 and wedge 58 as is the corner bracket so that the user has the choice, of fixing the hanger in place. The hanger is further provided with one or more notches 72 along its bottom edge which enable it to hook over and engage with a nail or picture hook previously mounted on a wall or other support.

The upper edge of the hanger is formed with a dome 74 which is so enlarged that it extends above the level of the side wall 32 of the frame member, forming an extending loop in which a hole 76 is provided. The hanger can then be placed on a nail or picture hook, previously located on the wall. If further desired, an undercut or scoring 78 can be made along a line separating the dome from the remaining portion of the body, which would facilate the removal of the dome 74. Thus, the user can remove the dome if the loop is not used, so that the hanger would be completely hidden from view, by the frame member.

It is some times desirable to mount the hanger 62 directly on the wall or support and thereafter attach the frame to it. In this instance, the hanger is provided with several small nail or screw holes 80. The hanger is first mounted on the wall and thereafter the frame is snapped onto the hanger, rather than the usual way of attaching hanger to frame first.

It is to be noted from FIGS. 2 and 3 that the flanges 68 and 70 on the hanger are slightly different than those on the corner bracket. That is, a pointed end on the barb is not essential since with properly chosen material, the locking feet have sufficient resiliency in either instance to pass through slot 44 into the channel 42 with equal ease. Actually, the form of the flange is not critical either for the corner bracket or hanger bracket. It will also be appreciated that the exact cross-sectional configuration of the border member is not critical provided that the rear face of the border member is provided with an elongated slot and widened channel for receipt of and grasping of the two ribs. It is the provision of a simple hanger, or corner bracket comprising basically a base piece, from the rear surface of which extends a pair of independently resilient ribs, that provides the extreme advantages of the present invention.

Since "art frames" are usually made of aluminum or plastic extrusions, the hanger and corner bracket, present very little, if any problem in manufacturing since these can be either extruded, molded or stamped. Further, because of the inherent resiliency, arising mainly from the constructional configuration of the ribs rather than from the choice of materials, a wide range of plastics, or aluminum alloys can be used. Additional fastening elements, such as screws or the like are not necessary.

Various changes, modifications and embodiments have been described herein and others will be obvious to those familiar with this art. Accordingly, it is intended that the present disclosure be taken as illustrative only of the invention and not limiting of its scope.

What is claimed:

1. A frame assembly comprising a plurality of border members arranged end to end to form a frame, each border member having a front, side and rear wall including a channel defined at least in part by said rear wall, said rear wall having a slot extending substantially the length thereof and opening into said channel, a plurality of corner brackets securing a different pair of adjacent border members together, and at least one hanger bracket for attaching the frame to a wall or the like, each of said corner brackets and hanger brackets comprising a flat base member having a pair of spaced ribs extending parallel to each other outwardly from one surface, each of said ribs having a flange at the end thereof, the flange of one rib extending in a direction opposite to that of the other rib, said ribs being flexible relative to said base members so as to be insertable within said slot having said flanges engage the inner surface of said rear wall.

2. The assembly according to claim 1 wherein said ribs are spaced apart a distance substantially equal to the span of said slot.

3. The assembly according to claim 2 wherein said flanges have barbed edges.

4. The assembly according to claim 1 wherein said brackets are made of plastic.

5. The assembly according to claim 1 wherein said brackets are made of aluminum.

6. The bracket according to claim 1 wherein the base of said corner bracket is formed of a pair of arms set at an angle to each other conforming to the angle at which the corresponding pair of adjacent border members are arranged, each of said arms being provided with a pair of spaced ribs.

7. The assembly according to claim 1 wherein said corner brackets are provided with an aperture therein located between said ribs, and is provided with a wedge insertable within said aperture to distend said ribs.

8. The assembly according to claim 1 wherein the bottom edge of the base of said hanger bracket is provided with at least one notch.

9. The assembly according to claim 1 wherein the base of said hanger bracket is provided with at least one screw or nail hole.

10. A bracket for a frame having a plurality of border members, at least one of which has a front, side and rear wall including a channel defined at least in part by said rear wall, said rear wall having a longitudinal slot opening into said channel, said bracket comprising a substantial flat base having a pair of spaced ribs extending substantial parallel to each other outwardly from one surface, each of said ribs having a flange at the end thereof, the flange of one rib extending in a direction opposite to that of the other rib, said ribs being substantially rigid but flexibly movable relative to said base and insertable through said slot into said channel so that said flanges resiliently engage the inner surface of said rear wall.

11. The bracket according to claim 10 wherein said ribs are spaced apart a distance substantially equal to the span of slot.

12. A frame assembly formed of a plurality of peripheral members arranged end to end to form an enclosed frame, each peripheral member having a front, side and rear wall including a channel defined at least in part by said rear wall, said rear wall having a slot extending substantially the length thereof and opening into said channel, a plurality of angular connectors respectively securing a different pair of adjacent border members together, said angular connectors comprising a pair of substantial flat base members each having a pair of spaced ribs extending parallel to each other outwardly from one surface, each of said ribs having a flange at the end thereof, the flange of one rib extending in a direction opposite to that of the other rib, said ribs being substantially rigid but flexibly movable relative to said base and insertable through said slot into said channel so that said flanges resiliently engage the inner surface of said rear wall.

13. The assembly according to claim 12 wherein said ribs are spaced apart a distance substantially equal to the span of said slot.

14. The assembly according to claim 12 wherein said flanges have barbed edges.

15. The assembly according to claim 12 wherein the base of said angular connector is formed of a pair of arms set at an angle to each other conforming to the angle at which the corresponding pair of adjacent border members are arranged, each of said arms being provided with a pair of spaced ribs, the ribs of one arm extending to meet the ribs of the other arm in a mitred joint.

16. The assembly according to claim 12 wherein said angular connectors are provided with an aperture therein located between said ribs, and is provided with a wedge insertable within said aperture to distend said ribs.

17. A hanger for a frame assembly formed of a plurality of border members, at least one of which has a front side and rear wall including a channel defined at least in part by said rear wall, said rear wall having a longitudinal slot opening into said channels, said hanger comprising a base member having a pair of spaced ribs extending substantially parallel to each other outwardly from one surface, each of said ribs having a flange at the end thereof, the flange of one rib extending in a direction opposite to that of the other rib, said ribs being substantially rigid but flexibly movable relative to said base and insertable through said slot into said channel so that said flanges resilient engage the inner surface of said rear wall.

18. The hanger according to claim 17 wherein said ribs are spaced apart a distance substantially equal to the span of said slot.

19. The hanger according to claim 17 wherein said flanges have barbed edges.

20. The hanger according to claim 17 wherein said bracket is provided with an aperture therein located between said ribs, and is provided with a wedge insertable within said aperture to distend said ribs.

21. The hanger according to claim 17 wherein the bottom edge of said base is provided with at least one notch.

22. The hanger according to claim 17 wherein said base is provided with at least one screw or nail hole.

* * * * *